(12) United States Patent
Seta

(10) Patent No.: US 6,552,742 B1
(45) Date of Patent: Apr. 22, 2003

(54) POSITIONAL DEVIATION ADJUSTING APPARATUS OF STEREO IMAGE

(75) Inventor: Itaru Seta, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 268 days.

(21) Appl. No.: 09/661,790

(22) Filed: Sep. 14, 2000

(30) Foreign Application Priority Data

Sep. 16, 1999 (JP) .......................................... 11-261438

(51) Int. Cl.$^7$ ........................ H04N 13/02; H04N 13/00; H04N 15/00
(52) U.S. Cl. ........................................ 348/42; 348/42
(58) Field of Search ........................... 348/42, 47, 43; 353/7; 352/57; 376/322, 324, 325; H04N 13/02, 13/00, 15/00

(56) References Cited

U.S. PATENT DOCUMENTS 5,668,595 A * 9/1997 Katayama et al. ....... 348/218.1
6,191,808 B1 * 2/2001 Katayama et al. ............ 348/39
6,384,859 B1 * 5/2002 Matsumot et al. ............ 348/43

FOREIGN PATENT DOCUMENTS

| JP | 5-114099 | 5/1993 |
| JP | 10-307352 | 11/1998 |

* cited by examiner

*Primary Examiner*—Nhon Diep
(74) *Attorney, Agent, or Firm*—Smith, Gambrell & Russell, LLP

(57) ABSTRACT

A positional deviation adjusting apparatus of a stereoscopic camera includes a correction circuit for transforming images geometrically according to transformation parameters and a calculating section. A plurality of reference areas are established on a reference line of one image and a reference point is established for every reference area. The calculating section identifies correlation points having a correlation with the respective reference points in the other image. Further, the calculating section calculates an approximation line based on the correlation points and corrects the transformation parameters in such a manner that the approximation line coincides with the reference line.

13 Claims, 14 Drawing Sheets

POSITIONAL DEVIATION ADJUSTING APPARATUS OF STEREO IMAGE

BACKGROUND OF THE INVENTION

1. Field of the Invention

The present invention relates to an adjusting apparatus for automatically adjusting positional deviation of stereoscopic images by means of geometrical image transformation processes.

2. Discussion of the Background Art

In recent years, a stereoscopic vehicle surrounding monitoring apparatus using a pair of left and right cameras (stereoscopic camera having solid image element like CCD) mounted on the vehicle has been interested by automobile engineers. To detect a distance to an object, first respective picture element blocks having coincidence of brightness are found in left and right images (stereo matching), then distance data are calculated according to the principle of triangulation from a parallax, namely a relative deviation amount, between both picture element blocks. Consequently, in order to calculate distance data with high reliability, it is desirable that there exists no positional deviation other than the parallax in a pair of left and right images (stereoscopic images). In actual world, however, the stereoscopic camera has some amount of positional error caused when the camera is installed on the vehicle.

With respect to this, Japanese Patent Application Laid-open No. Toku-Kai-Hei 10-307352 discloses a technology in which the positional deviation of the stereoscopic camera is corrected by applying a geometric transformation to the stereoscopic image. That is, when an initial adjustment of the positional deviation is made or when a readustment of the positional deviation generated by aged deterioration is made, a dedicated correction detecting device is connected with an image correction apparatus performing the affine transformation to calculate the difference of angle of view, a rotational deviation or a parallel deviation of the stereoscopic image obtained by imaging a specified pattern for adjustment and to establish (reestablish) parameters of the affine transfomation according to the result of the calculation. The positional deviation is equivalently corrected by applying the affine transformation to images based on thus established affine parameters.

However, according to the prior art, a special adjustment pattern is imaged by the stereoscopic camera and the deviation is corrected based on the position of the pattern in images. Accordingly, when the correction is performed, it is necessary to interrupt the ordinary surroundings monitoring control and as a result this prior art is not suitable for a real time processing in which the monitoring control is carried out concurrently.

SUMMARY OF THE INVENTION

It is an object of the present invention to provide an adjusting apparatus capable of correcting the positional deviation of stereoscopic images in real time in parallel with the surroundings monitoring control.

In order to attain the object, a positional deviation adjusting apparatus of a stereoscopic camera taking a first image or a reference image and a second image or a comparison image, comprises an image correcting means for transforming an image geometrically according to transformation parameters, a reference area establishing means for establishing a plurality of reference areas in a first image transformed by the image correcting means, a reference point establishing means for establishing a reference point in the reference area for each of the reference points, a reference line establishing means for establishing a reference line passing through the reference points, a searching area establishing means for establishing a searching area corresponding to the reference area in a second image, a correlation point identifying means for identifying a correlation point having a correlation with the reference point for each of the searching areas, an approximation line calculating means for calculating an approximation line based on the correlation points and a parameter correcting means for correcting the transformation parameters such that the approximation line coincides with the reference line.

DETAILED DESCRIPTION OF THE PREFERRED EMBODIMENTS

Figure 1:
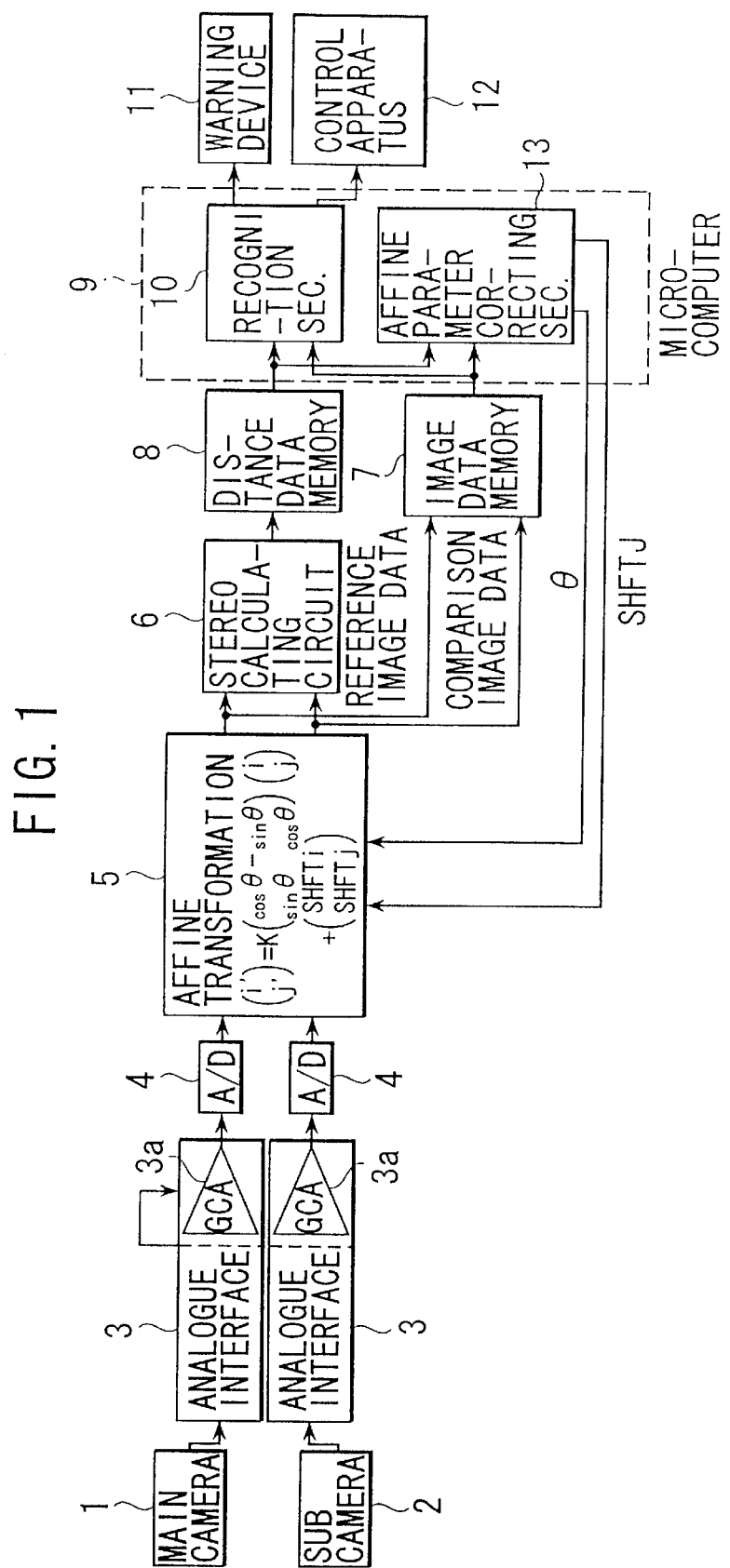
FIG. 1 is a block diagram of a stereoscopic type surroundings monitoring apparatus using an adjusting apparatus according to the present invention.

Referring now to FIG. 1, a stereoscopic camera for imaging a surrounding scenery of a vehicle is composed of a pair of left and right cameras 1, 2 incorporating an image sensor such as CCD and the like and mounted in the vicinity of a room mirror of the vehicle. The cameras 1, 2 are mounted at a specified interval in the transversal direction of the vehicle. A main camera 1 is for obtaining a reference image data and is mounted on the right side when viewed in the traveling direction of the vehicle. On the other hand, a sub camera 2 is for obtaining a comparison image data and is mounted on the left side when viewed in the traveling direction of the vehicle. In a state of the cameras 1, 2 synchronized with each other, analogue images outputted from the respective cameras 1, 2 are adjusted in an analogue interface 3 so as to coincide with an input range of circuits at the latter stage. Further, the brightness balance of the images is adjusted in a gain control amplifier (GCA) 3a of the analogue interface 3.

The analogue image signals adjusted in the analogue interface 3 are converted into digital images having a specified number of brightness graduations (for example, a grayscale of 256 graduations) by an A/D converter 4. Respective digitalized data are subjected to an affine transformation in a correction circuit 5. That is, the positional error of the stereoscopic cameras 1, 2 which is caused when the cameras 1, 2 are installed, generates deviations of stereoscopic images such as a rotational deviation, parallel deviation and the like. The error is equivalently corrected by applying the affine transformation to the images. In this specification, a term "affine transformation" is used for comprehensively naming a geometrical coordinate transformation including rotation, movement, enlargement and reduction of images. According to this embodiment, a linear transformation expressed in Formula 1 is applied to original images using four affine parameters.

$$\begin{pmatrix} i' \\ j' \end{pmatrix} = \kappa \begin{pmatrix} \cos\theta & -\sin\theta \\ \sin\theta & \cos\theta \end{pmatrix} \begin{pmatrix} i \\ j \end{pmatrix} + \begin{pmatrix} SHFTI \\ SHFTJ \end{pmatrix}$$ [Formula 1]

where (i, j) is coordinates of an original image and (i', j') is coordinates after transformation. Further, affine parameters SHFTI, SHFTJ mean a movement in a "i" direction (horizontal direction of image), a movement in a "j" direction (vertical direction of image), respectively. Further, affine parameters θ, K indicate a rotation by θ, an enlargement (reduction in case of |K|<1) by K times, respectively.

The affine parameters θ, K, SHFTI, SHFTJ of the reference image and the affine parameters K, SHFTJ are fixed values (initially established values). On the other hand, two affine parameters θ, SHFTJ are valuable and these are calculated in the micro-computer 9. By means of making the affine parameters θ, SHFTJ valuable, the deviation (rotational deviation and vertical deviation) of the comparison image on the basis of the reference image is adjusted so as to become zero in real time. The detail of these processes will be described hereinafter. Thus, the affine transformation applied to the stereoscopic image assures a coincidence of the horizontal line in both images, which is essential for securing the accuracy of the stereo matching. The hardware constitution of the affine transformation circuit is described in Japanese Patent Application Laid-open No. Toku-Kai-Hei 10-307352.

Thus, through such image processing, the reference image data composed of 512 pixels horizontally and 200 pixels vertically are formed from output signals of the main camera 1. Further, the comparison image data having the same vertical length as the reference image and a larger horizontal length than the reference image, for example composed of 640 pixels horizontally and 200 pixels vertically, are formed from output signals of the sub camera 2. These reference image data and comparison image data are stored in an image data memory 7.

A stereo calculating circuit 6 calculates a distance data based on the reference image data and the comparison image data. Since one distance data is produced from one pixel block constituted by 4×4 pixels, 128×50 distance data are calculated per one reference image of a frame size. With respect to a given pixel block in a reference image, a corresponding pixel block in a comparison image is identified by searching an area having the same brightness and the same pattern as that given pixel block of the reference image (stereo matching). The distance from the camera to an object projected in the stereo image is expressed as a parallax in the stereo image, namely a horizontal deviation amount between the reference and comparison images. Accordingly, in searching the comparison image, the search is performed on the same horizontal line (epipolar line) as a j coordinate of the reference image. In the stereo calculating circuit 6, the correlation is evaluated for every pixel block between the object pixel block and the searching pixel block while shifting a pixel one by one on the epi-polar line.

The correlation between two pixel blocks can be evaluated by calculating a city block distance CB as expressed in Formula 2 for example.

$$CB = |p1ij - p2ij|$$ [Formula 2]

where p1ij is a brightness data of a pixel at the address ij of one pixel block and p2ij is a brightness data of a pixel at the address ij of the other pixel block.

The city block distance CB is a sum of the difference (absolute value) of brightness values p1ij and p2ij over entire pixel blocks. The correlation between both pixel blocks becomes larger as the difference is smaller.

The city block distance CB is calculated for every pixel block existing on the epipolar line. When the value of the city block distance CB is smallest at a certain pair of pixel blocks, the other pixel block of the pair in the comparison image is judged to be a correlation object of the one pixel block of the pair in the reference image. A distance data is calculated from a parallax between thus identified pair of pixel blocks. The distance data thus calculated are stored in a distance data memory 8. The hardware constitution for calculating the city block distance is disclosed in Japanese Patent Application No. Toku-Kai-Hei 5-114099.

The micro-computer 9 or functionally, a recognition section 10 recognizes road configurations (white markers), solid objects (preceding vehicles) ahead of the vehicle and the like. These recognitions are performed based on the image data stored in the image data memory 7 and the distance data stored in the distance data memory 8. Further, other information not shown in the drawings such as information from a vehicle speed sensor, a steering sensor, a navigation system and the like, is referenced when it is necessary. Further, when it is judged based on the result of the recognition that the warning against curved roads or solid objects in front of the self-vehicle is required, a warning device 11 such as a monitoring display, speaker and the like operates to call a driver's attention. Further, by controlling a control apparatus 12 as needed, a vehicle control such as a shift-down of an automatic transmission, a slow-down of engine power, or a depression of brake pedal, is carried out.

(First Embodiment)

Figure 2:
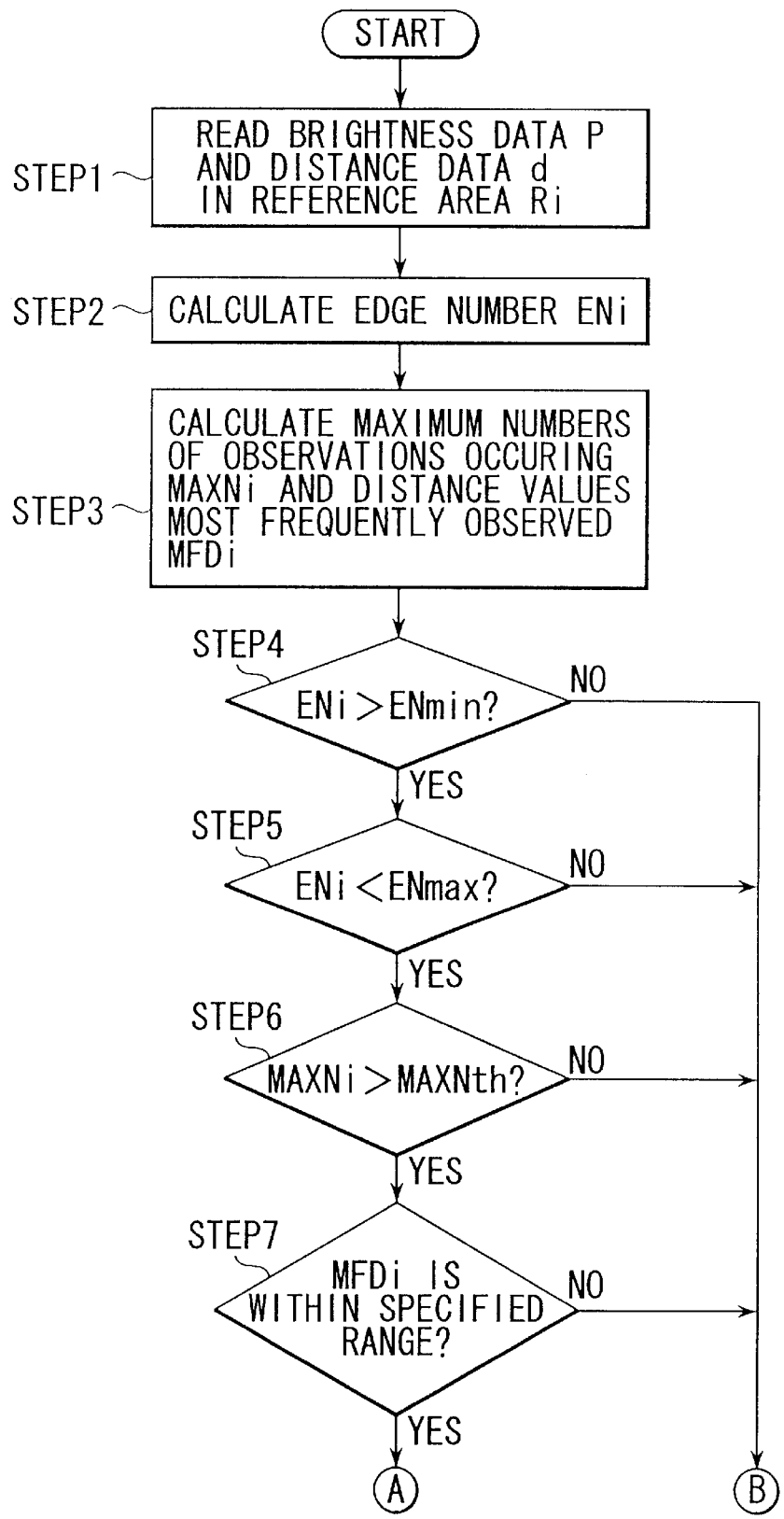
FIG. 2 is a flowchart showing steps for adjusting affine parameters according to a first embodiment of the present invention.
Figure 3:
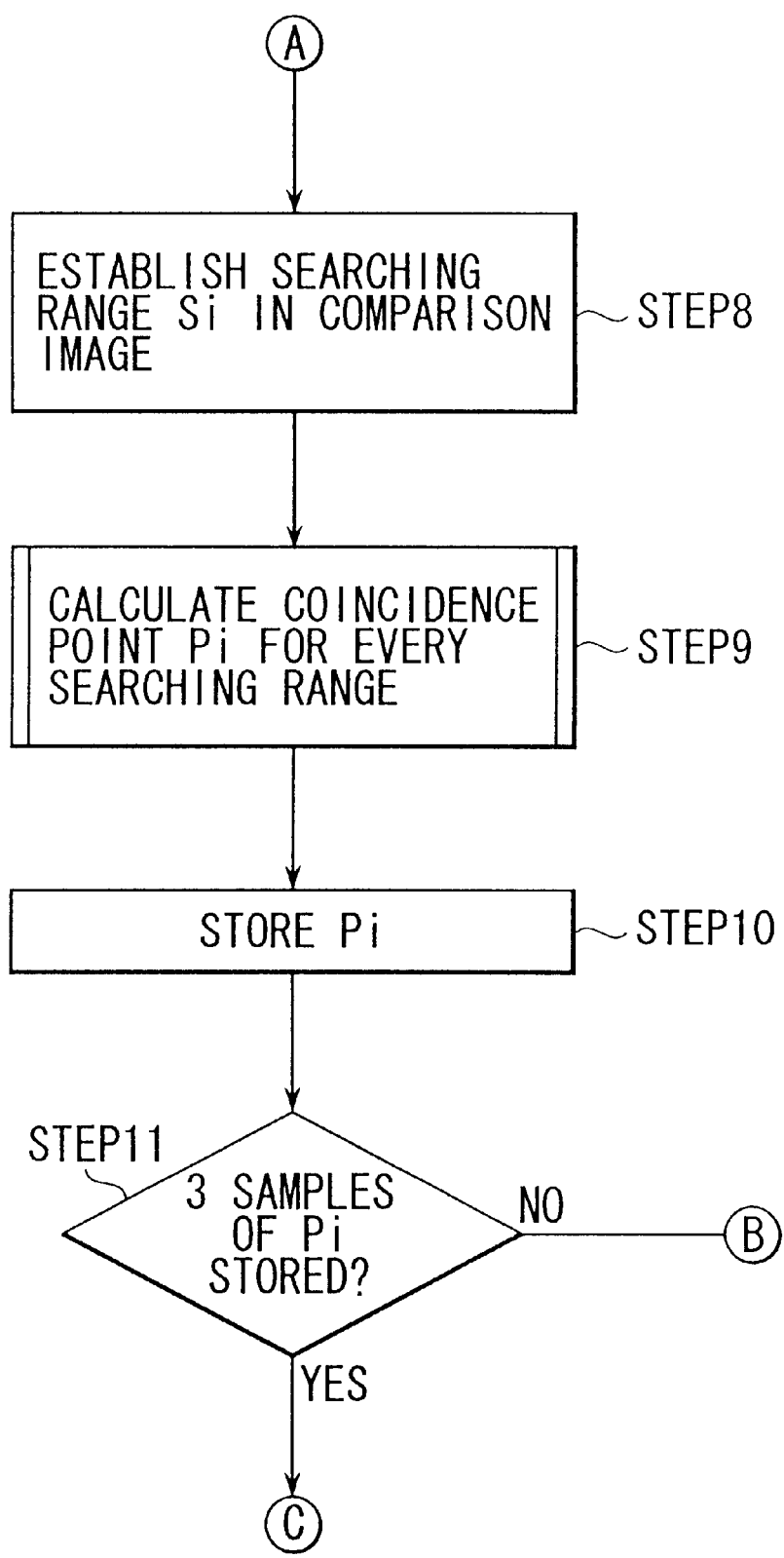
FIG. 3 is a flowchart showing steps continued from FIG. 2.
Figure 4:
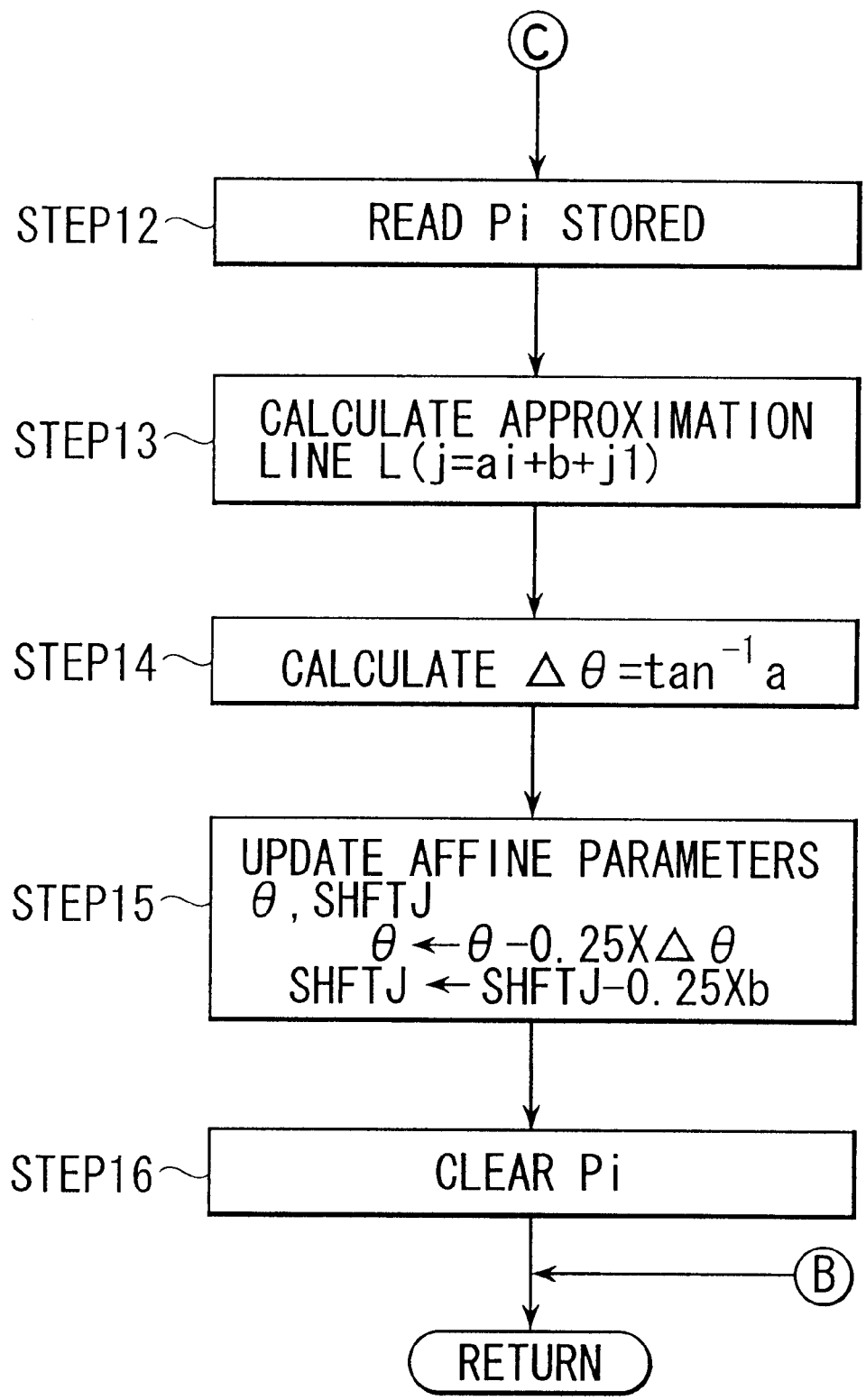
FIG. 4 is a flowchart showing steps continued from FIG. 3.

The micro-computer 9 or functionally, a calculating section 13 makes an adjustment of a value of the affine parameter θ expressing a rotation of the comparison image and a value of the affine parameter SHFTJ expressing the vertical movement of the comparison image according to the steps shown in the flowcharts of FIGS. 2 through 4. The adjusted affine parameters θ, SHFTJ are fed back to the correction circuit 5. The flow of control shown in these flowcharts is repeatedly carried out for every cycle of a specified time.

Figure 6:
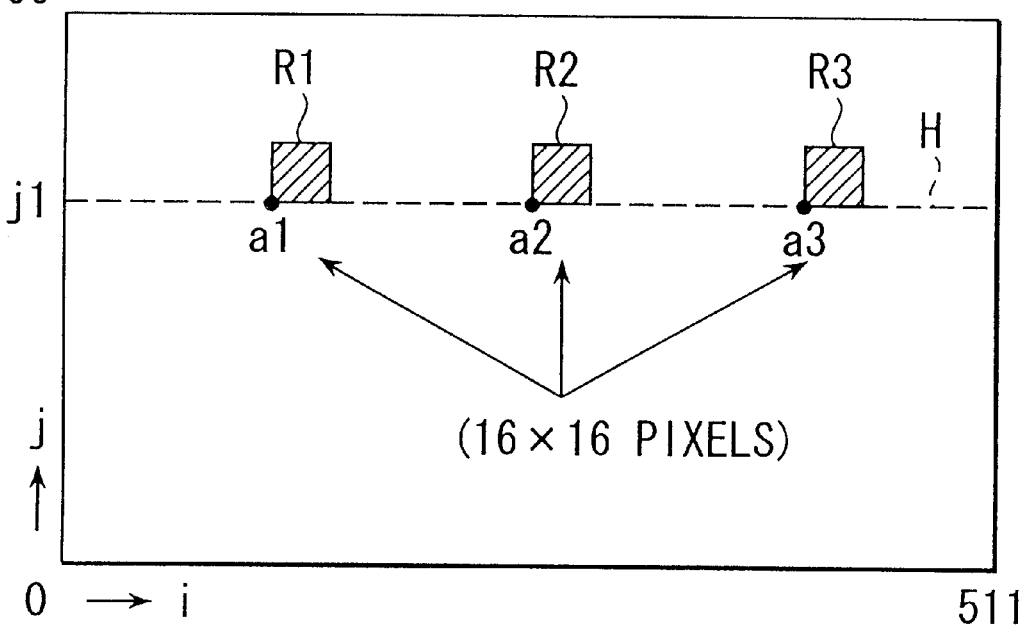
FIG. 6 is a diagram showing the position of respective reference areas in a reference image.

At a step 1, brightness data "p" and distance data "d" of three reference areas R1, R2 and R3 established in the reference image are read. The reference area Ri ($1 \leq i \leq 3$) is established on a relatively upper side of the reference image as shown in FIG. 6 and each area has a size of 16×16 pixels. The reference area Ri is established in an area where solid objects are likely to be observed, in other words, an area where a brightness edge (a part having a great variation in brightness) is likely to appear. Therefore, it is preferable that the reference area Ri is avoided from being established at an area located on an extremely upper side (this area is likely to project the sky not containing so many brightness edges) or an area located on an extremely lower side (this area is likely to project roads not containing so many brightness edges).

Figure 16:
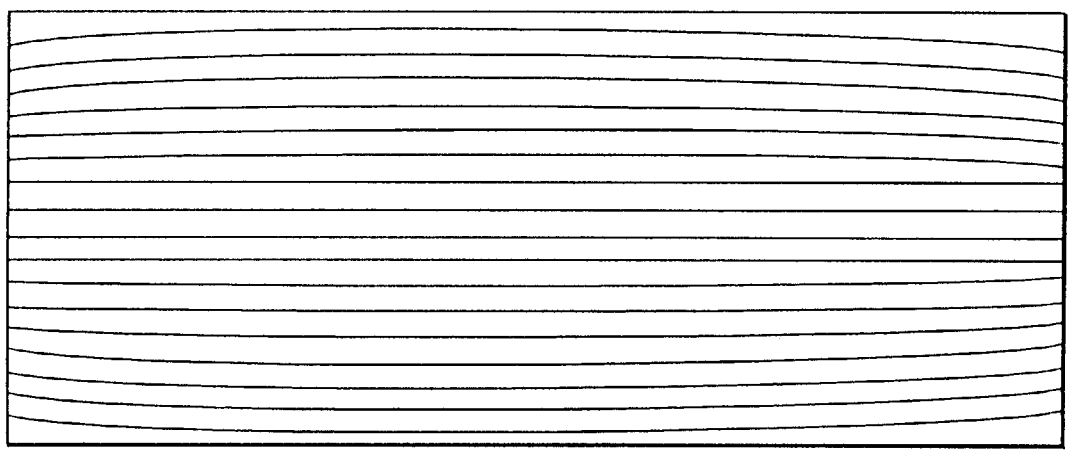
FIG. 16 is a diagram showing an image in which non-linear distortions exist.

Further, respective reference areas Ri are established so as to align on a straight line called a reference line H. That is, as shown in FIG. 6, letting a reference point representing a position of the reference area Ri be a coordinate ai at the left lower corner thereof, the reference point ai is established so as to lie on the reference line H (j=j1 in j coordinate) extending in the horizontal direction. One of the features of this embodiment is to establish an approximation line corresponding to the reference line H in the comparison image and to adjust the affine parameters θ, SHFTJ based upon the deviations (rotational deviation and horizontal deviation) between the reference line H and the approximation line. Accordingly, respective reference points ai are required to align on a straight line in the reference image. Generally, since the reference line H can be defined by identifying two reference pints ai, the establishment of at least two reference areas Ri enables to make a positional adjustment which will be described hereinafter. However, from the view point of enhancing the accuracy of the adjustment, it is preferable that more than three reference points ai (or reference areas Ri) are established so as to be scattered uniformly in the horizontal direction over the entire image. As shown in FIG. 16, the image picture has nonlinear distortions caused by the effect of aberration of lenses of the camera 1, 2 or the tilt of the light receiving surface of the image pickup element. Accordingly, it is possible to some extent to reduce errors of the approximate line arose from these non-linear distortions by establishing more than three reference points ai or reference areas Ri.

Figure 7:
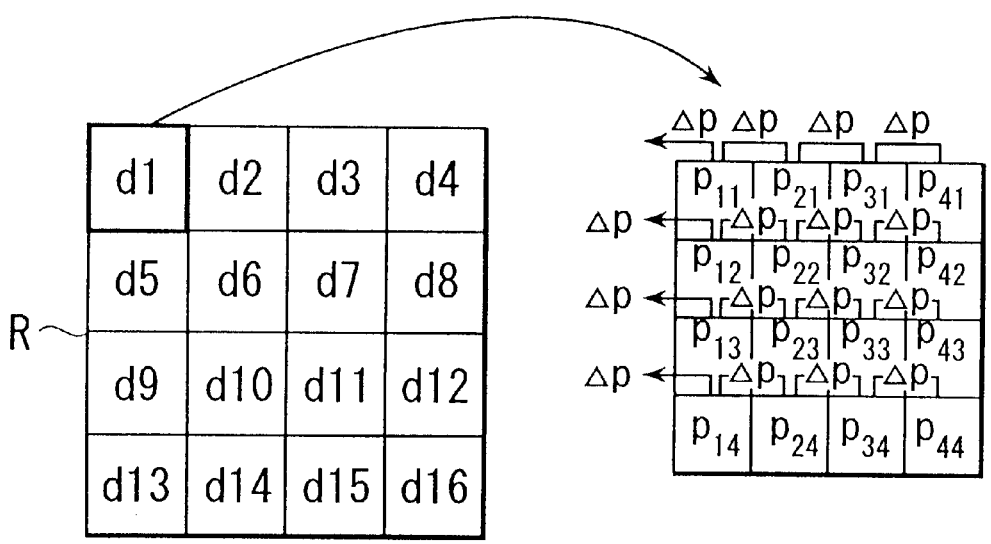
FIG. 7 is a diagram showing a brightness data and a distance data in a given reference area.

At a step 2 following the step 1, the number of brightness edges Eni is calculated for each reference area Ri. As shown in FIG. 7, the reference area Ri includes 4×4 pieces of the distance data d and 16×16 pieces of the brightness data p. A brightness block shown on the right side of FIG. 7 corresponds to a pixel block with respect to a distance data d1. The difference (or variation) of brightness Δp (absolute value) is calculated for every pair of horizontally adjacent pixels from 256 pieces of the brightness data p. With respect to the pixel block d1 located on the far left side of the reference area R, the brightness difference Δp is calculated from pixels leftward adjacent to the pixels p11, p12, p13 and p14. Similar calculations are made for the pixel blocks d5, d9 and d13. When 256 pieces of the brightness differences Δp are calculated, next a number of brightness edges EN is counted. The number of brightness edges EN is a number of the brightness differences Δp exceeding a specified threshold value. The edge number ENi is calculated for every reference area Ri and three edge numbers EN1, EN2 and EN3 calculated.

Figure 8:
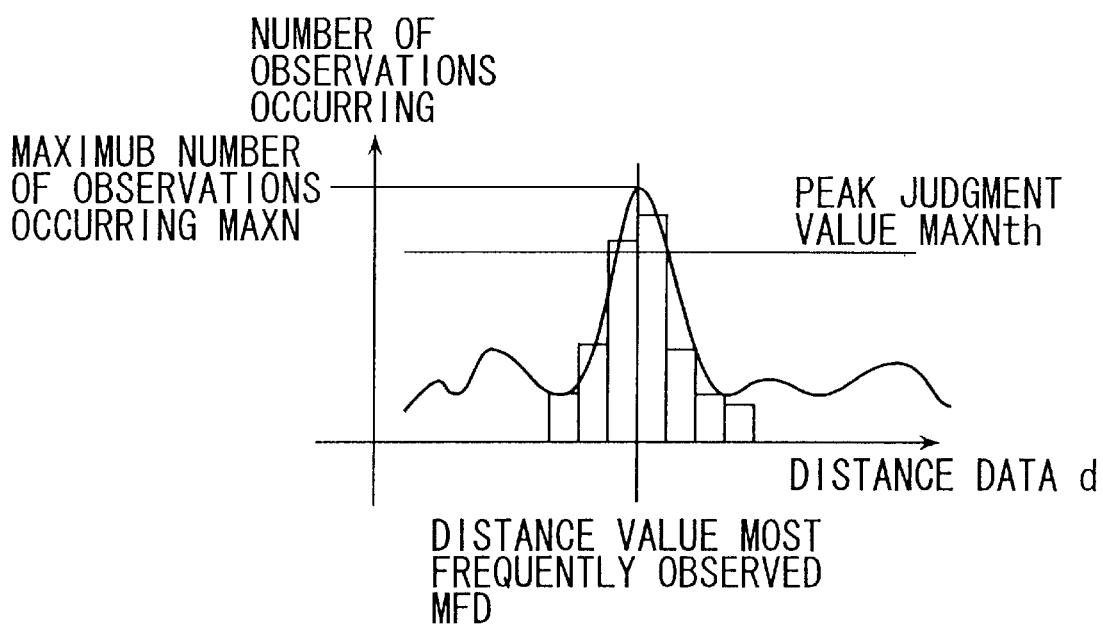
FIG. 8 is a histogram showing a distribution of the number of observations occurring of distance data in a given reference area.

Next, at a step 3, a distribution of the distance data is obtained for every reference area Ri and a maximum number of observations occurring MAX Ni and a distance value most frequently observed MFDi are calculated, respectively. As described before, since one distance data is produced for each pixel block of 4×4 pixels, one reference area R has 16 distance data di (see FIG. 7). FIG. 8 is an example of a histogram showing a distribution of the number of observations occurring of the distance data di in the reference area R. In the drawing, the distance data is expressed on an axis of abscissa and the number of observations is expressed on an axis of ordinate. A maximum number of observations occurring MAX N is identified from this histogram and a distance value most frequently observed MFD is identified. Since the maximum number of observations occurring MAX N and the distance value most frequently observed MFD are calculated for every reference area Ri, at a step 3 three maximum numbers of observations occurring MAX N1, MAX N2, MAX N3 and three distance values most frequently observed MFD1, MFD2, MFD3 are calculated respectively.

Based upon values calculated at the steps 2 and 3, it is evaluated at steps 4 through 7 whether or not the reference area Ri is a suitable area for performing a two-dimensional matching. "Suitable area" is formed when all of the following judging conditions are satisfied.

(Judging Conditions)

1. An Edge Number ENi is Larger than a Minimum Specified Value En min—Step 4

In searching a correlation object of the reference area Ri, when the edge number EN is small (that is, so many brightness edges do not exist), the stereo matching is apt to fail. Accordingly, in order to enhance the accuracy of the two-dimensional matching, it is necessary that the edge number ENi is larger than a minimum specified value En min properly established, that is, the reference area Ri has brightness edges.

2. An Edge Number ENi is Smaller than a Maximum Specified Value En max (En max>En min)—Step 45

In searching a correlation object of an area in which hedges, woods and the like are projected, since the area contains a lot of similar brightness edges arose from shadows of bushes, it is difficult to identify a suitable correlation object. Accordingly, in case where hedges and the like are projected in a reference area Ri, it is judged from the view point of enhancing the accuracy of the two-dimensional matching that the reference area Ri is not appropriate for performing the matching. Under the situation where hedges and the like are projected, there is a tendency that more brightness edges than usual are observed. Based on this idea, it can be judged whether or not the reference area Ri is a suitable area for the two-dimensional matching by comparing the edge number Eni with a maximum specified value En max properly established.

3. A Maximum Number of Observations Occurring MAX Ni is Larger than a Peak Judgment Value MAX Nth—Step 46

This judging condition is for evaluating an effect of an occlusion. In case where the reference area Ri has not so much effect of the occlusion, there is a tendency that a large peak is observed in a histogram as shown in FIG. 8. On the other hand, in case where the reference area has an effect of the occlusion, there is a tendency that as the effect becomes larger, the height of the peak is reduced and a plurality of small peaks are observed. From this point of view, if the maximum number of observations occurring MAX N is larger than a peak judgment value properly established, it is judged that the reference area R has no effect of the occlusion and therefore the area is suitable for evaluation.

4. The Distance Value Most Frequently Observed MFDi is within a Specified Range—Step 47

This judging condition is for evaluating the effect of noises relative to the distance data. Normally, the value of the distance data tends to come within a specified distance range. This is because there is a tendency that the distance to solid objects usually projected in the reference area Ri comes within a specified range. Accordingly, the distance range can be established beforehand, taking the distance to the solid objects usually projected in the reference area Ri into consideration. In case where the distance value most frequently observed MFDi comes out of this range, it is judged that the reference area Ri is not suitable for evaluation. In this embodiment, a range of 16 to 70 meters (corresponding to a pixel deviation amount of 24 to 6 pixels) is established as a specified distance range.

Only when four judging conditions as described above are satisfied with respect to all of three reference areas R1, R2 and R3, it is judged that the reference area R is a suitable area for the stereo matching. That is, the program goes through respective judgments of steps 4 to 7 and goes to a step 8 as shown in FIG. 8. In cases other than this, the program goes to RETURN.

Figure 9:
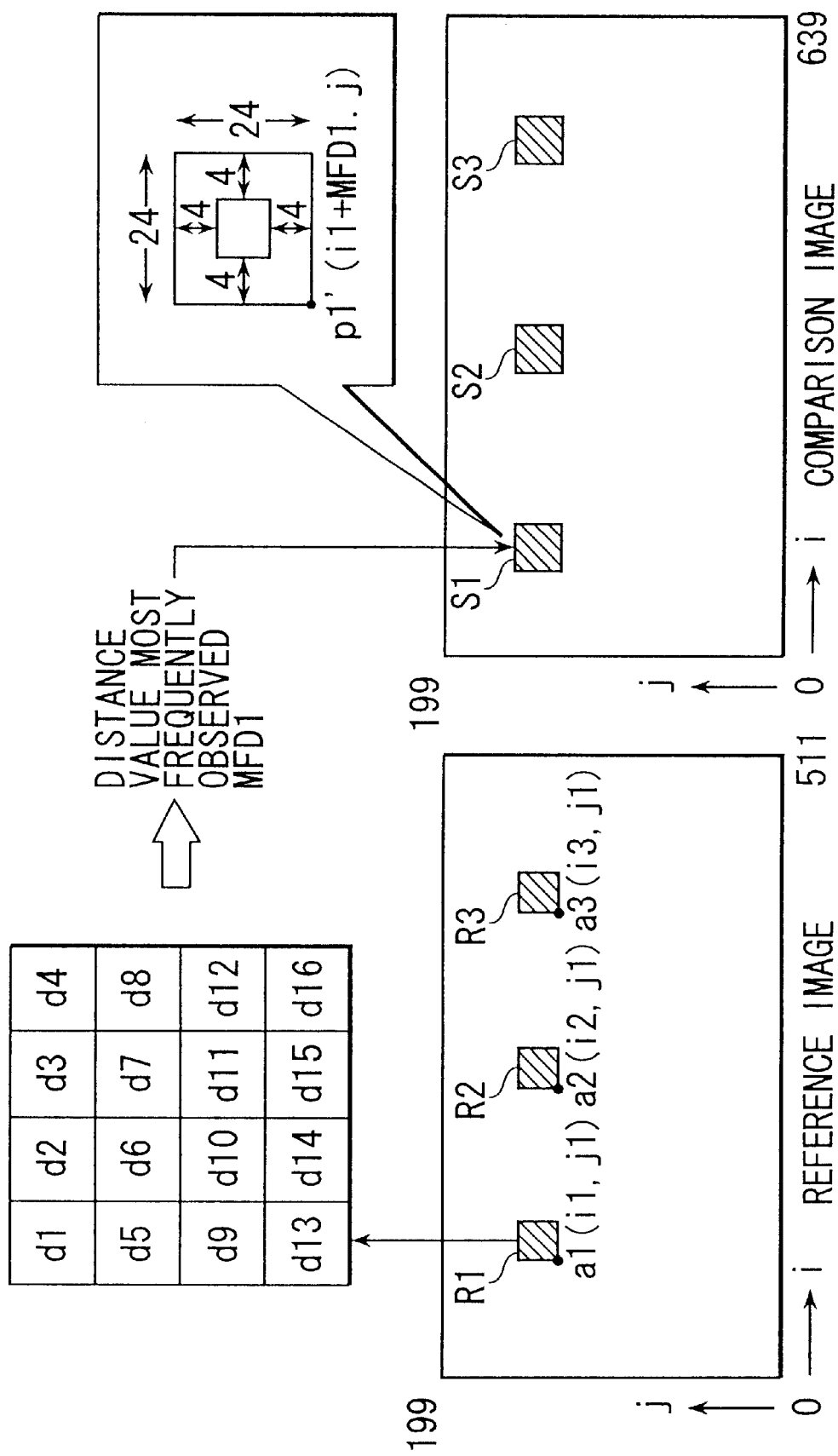
FIG. 9 is a diagram for explaining the establishment of the position of searching ranges.

Steps 8 though 11 are ones for producing a coincidence point Pi. First at the step 8, a searching range Si is established for each reference area Ri in the comparison image based on a distance data d, specifically a distance value most frequently observed MFDi, in the reference area Ri. FIG. 9 is a diagram for explaining the positioning of the searching range Si. Exemplifying a reference area R1 located on the far left side of the reference image, letting the left below corner of the reference area R1 in the reference image be al whose coordinates are (i1, j1) and letting the distance value most frequently observed of the reference area be MFD1 the correlation object of the reference area R1 exists in the vicinity of an area (16×16 pixels having the same size as the reference area R1) which horizontally deviates by the distance value most frequently observed MFD1. Letting the left below corner of the area be P1', the coordinates of P1' are (i1+MFD1, j). The searching range S1 may have the same size as the reference area R1 but in this embodiment the searching range is enlarged by 4 pixels upwardly, downwardly, leftwardly and rightwardly, respectively. Accordingly, the searching range S1 is established to have an area of 24×24 pixels. In the similar way, searching ranges S2 and S3 are established for the reference area R2 and R3, respectively. In this embodiment, the distance value most frequently observed MFDi is used for the deviation amount, however, alternatively, a mean value of the distance data d of a reference area Ri may be used in place of the distance value most frequently observed MFD1.

Figure 5:
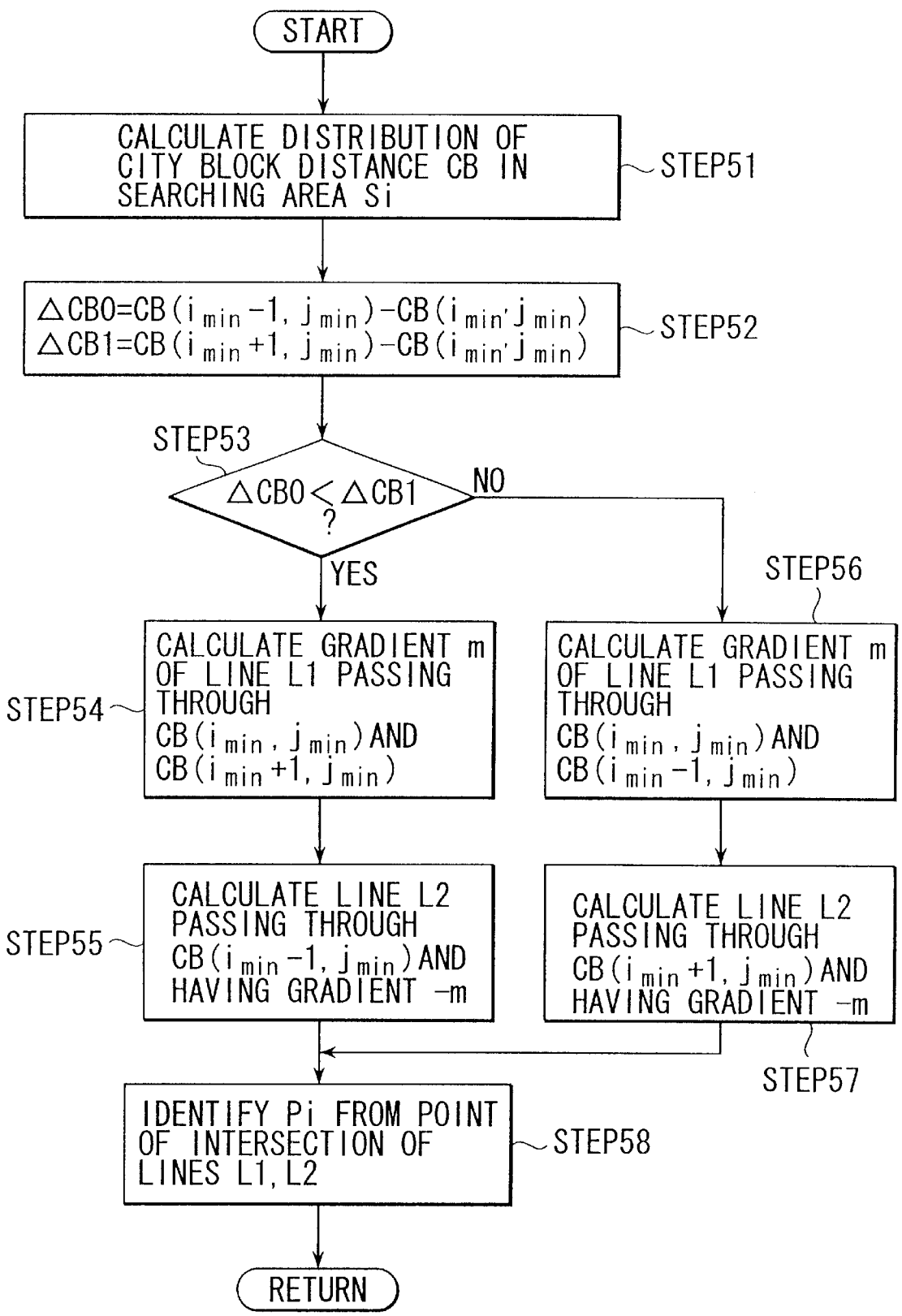
FIG. 5 is flowchart showing steps for calculating a coincidence point.
Figure 10:
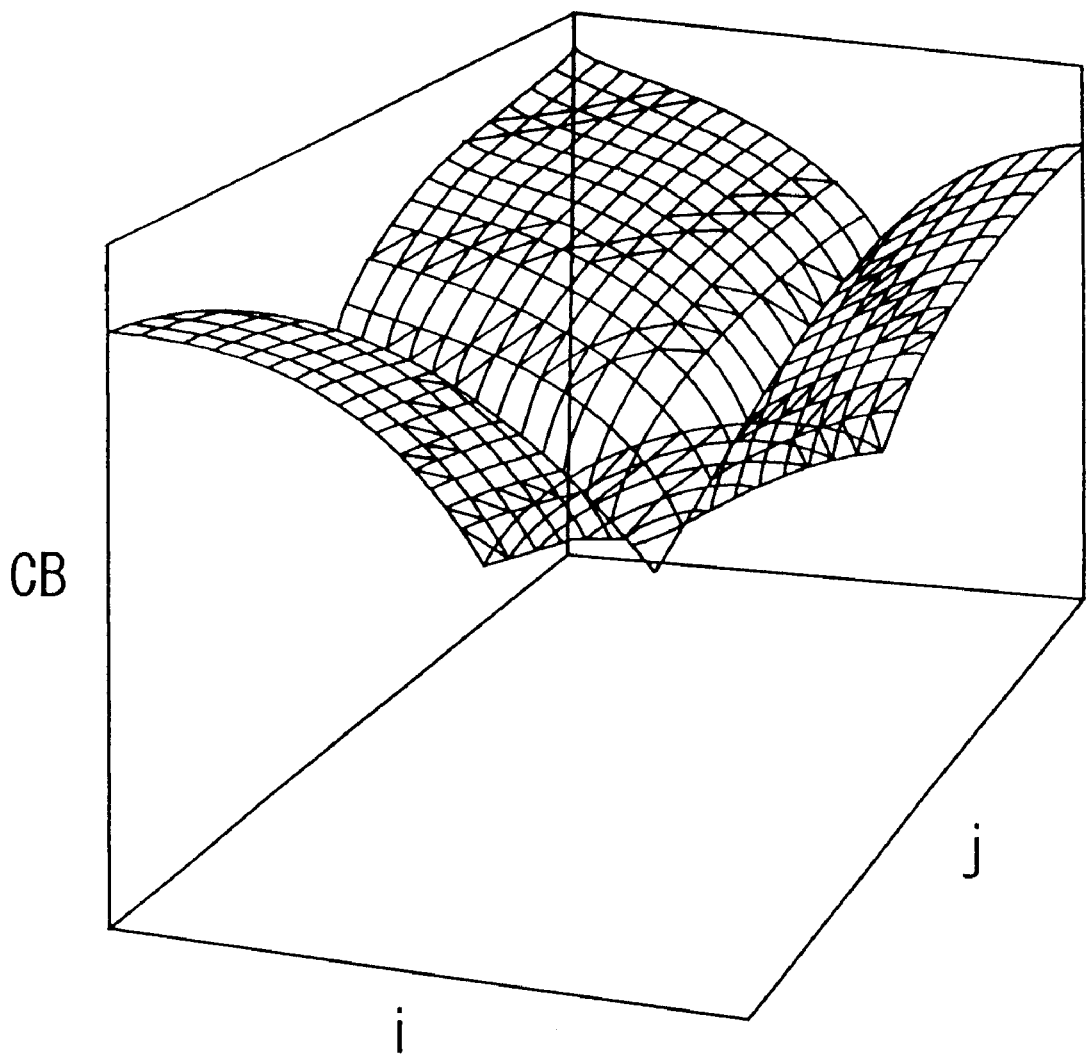
FIG. 10 is a diagram showing a distribution of a city block distance in a reference area.

Further, at a step 9, the coincidence point Pi is calculated for every searching range Si produced at the step 8. Here, the coincidence point Pi denotes a position in the comparison image corresponding to a position ai of the reference are a Ri. FIG. 5 is a flowchart showing calculation steps of the coincidence point Pi in the searching area Si. First, at a step 51 a distribution of the city block distance CB between a pixel area of 16×16 pixels in the reference area Ri and respective pixel areas of 16×16 pixels in the searching range Si, is calculated. Since the city block distance is calculated one pixel by one pixel horizontally and vertically for every pixel area of 16×16 pixels existing in the searching range Si according to the formula 2 described before, 81 (9×9) pieces of city block distances CB are produced for one searching range Si. Hence, the distribution of the city block distances CB as shown in FIG. 10 is obtained over the entire searching range Si. FIG. 10 is a matrix-like distribution diagram composed of city block distances CB. Respective city block distances are expressed in CB (i, j) which denotes a value of CB at coordinates (i, j) located at the left below corner of each pixel area.

At steps 52 and after, the coincidence point Pi in the searching area Si is calculated. The coincidence point Pi is obtained basically as coordinates (i min, j min) of a point where the city block distance CB is minimum, that is, a point where the correlation becomes largest. However, these coordinates (i min, j min) are discrete values and therefore it is impossible to identify the position of the coincidence point Pi with resolution of one pixel or smaller. Because of this, it is not preferable from the point of accuracy to use this value directly for an input variable in correcting the positional deviation of image. Hence, regarding the coordinates (i min, j min) as a temporal coincidence point Pi', a new coincidence point Pi (isub, jsub), capable of positioning with resolution of one pixel or smaller according to the following processes.

In case where the minimum value of the city block distance CB is larger than a threshold value, the calculation of a coincidence point Pi for that cycle may be skipped. As a result, an inappropriate correlation object can be prevented from being identified.

Figure 11:
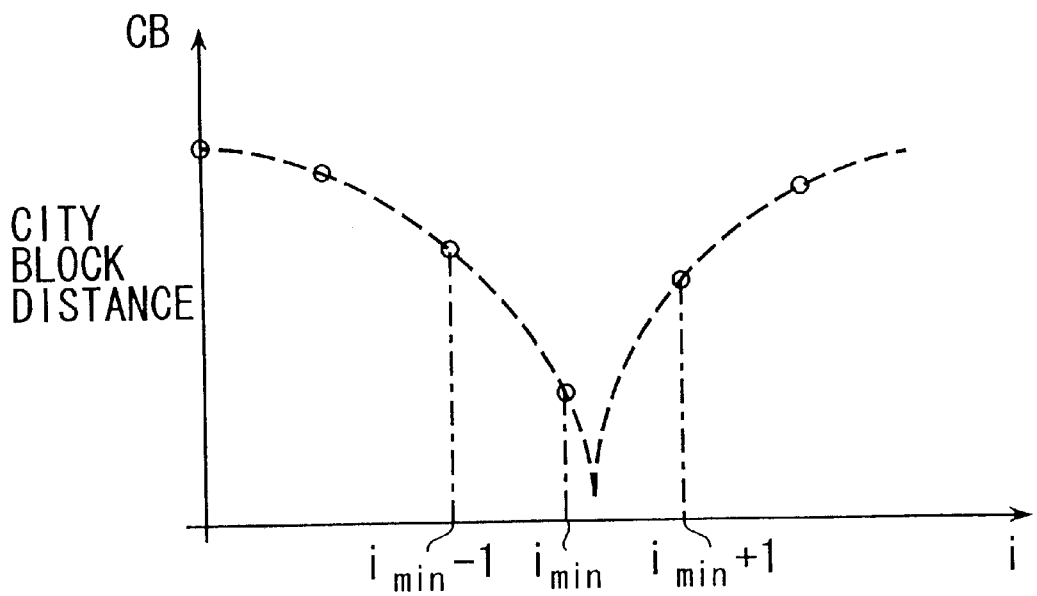
FIG. 11 is a diagram for explaining a distribution characteristic of a city block distance in the vicinity of a minimum point.

Below, the method of calculating an i coordinate value of the coincidence point Pi, that is, an i coordinate value of the minimum point where the city block distance CB is minimum will be described. Further, a j coordinate value of the coincidence point Pi can be calculated by exactly the same method as this. FIG. 11 is for explaining a distribution characteristic of the city block distance CB in the vicinity of a minimum point on a j min line. In the drawing, values of the city block distance CB calculated at the step 51 are plotted in round mark. Assuming that the area (size) of the pixel is infinitely small, the city block distance CB has a characteristic of distributing symmetrically and consecutively in the vicinity of the minimum point, as shown in a broken line of FIG. 11. From this point of view, the minimum point of the broken line, that is, an i coordinate value of the coincidence point Pi differs from the i coordinate value of the temporary coincidence point Pi'.

Utilizing the characteristic that the distribution of the city block distance CB is symmetrical in the vicinity of the minimum point, at steps 52 and after, the difference between city block distances CB on the left side of the temporary coincidence point Pi' is compared with the difference between city block distances CB on the right side. Further, a minimum point, that is, an i coordinate value of the coincidence point Pi is calculated by linear approximation. First, at a step 52, a variation of the i coordinate value i min−1 with respect to the i coordinate value i min of the temporary coincidence point Pi' is obtained as shown in the following Formula 3. Thus, a variation of the city block distance CB on the left side of the temporary coincidence point Pi' is evaluated. Similarly, a variation of the i coordinate value i min+1 with respect to the I coordinate value i min of the temporary coincidence point Pi' is obtained. Thus, a variation of the city block distance CB on the right side of the temporary coincidence point Pi' is evaluated.

$$\Delta CB0 = CB(i\ min-1, j\ min) - CB(i\ min, j\ min) \qquad \text{[Formula 3]}$$

$$\Delta CB1 = CB(i\ min+1, J\ min) - CB(i\ min, j\ min)$$

Where $\Delta CB0$ is a difference of city block distance on the left side and $\Delta CB1$ is a difference of city block distance on the right side.

Next, at a step 53, the difference of city block distance on the left side ΔCB0 is compared with the difference of city block distance on the right side ΔCB1. Based on the characteristic that the distribution of the city block distance is symmetric around the minimum point, it can be judged whether the minimum point exists between coordinate values i min−1 and i min or between coordinate values i min+1 and i min.

At the step 53, if it is judged that ΔCB0 is smaller than ΔCB1, that is, the variation of the city block distance CB is larger on the right side than on the left side, it is judged that the minimum point is situated between coordinate values i min and i min−1. In this case, the program goes to a step 54 where a gradient m of a line L1 connecting the point CB (i min, j min) with the point CB(i min+1, j min) is calculated. Further, at a step 55, a line L2 going through the point (i min−1, j min) and whose gradient is −m is obtained. Then, the program goes to a step 58 where a point of intersection of lines L1 and L2 is calculated. That is, the point is a true minimum value, namely, an i coordinate value isub of the coincidence point Pi.

On the other hand, at the step 53, if it is judged that CB0 is larger than ΔCB1, that is, the variation of the city block distance CB is larger on the left side than on the right side, it is judged that the minimum point is situated between coordinate values i min and i min+1. In this case, the program goes to a step 56 where a gradient m of a line L1 connecting the point CB (i min, j min) with the point CB(i min−1, j min) is calculated. Further, at a step 57, a line L2 going through the point (i min+1, j min) and whose gradient is −m is obtained. Then, the program goes to a step 58 where a point of intersection of lines L1 and L2 is calculated and a true minimum value, namely, an i coordinate value isub of the coincidence point Pi is determined.

Figure 12:
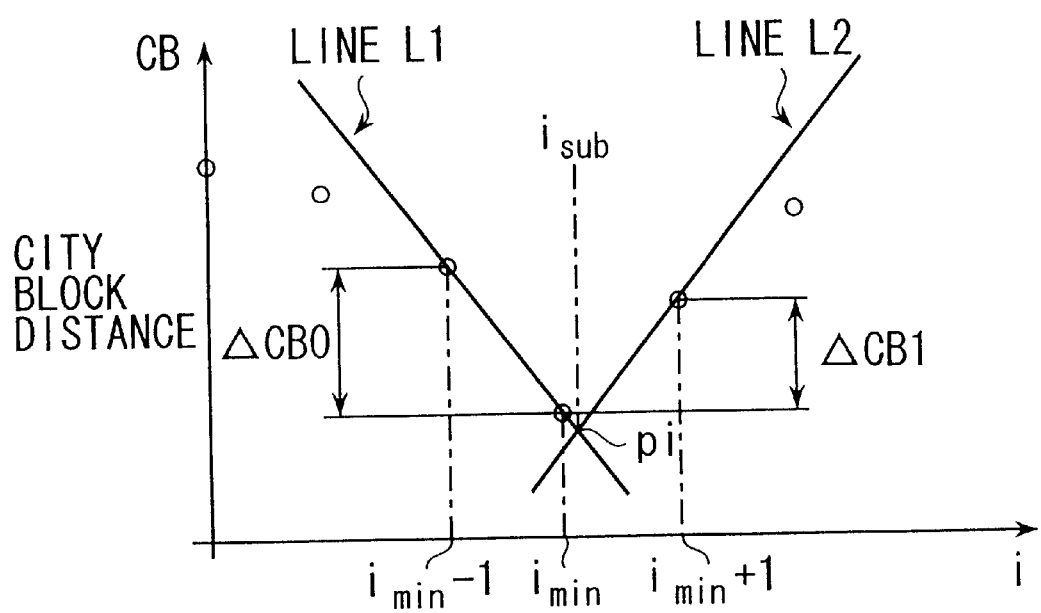
FIG. 12 is a diagram for explaining a calculation method of a coincidence point according to a linear approximation.

FIG. 12 shows the lines L1 and L2 calculated in case where the difference of city block distance ΔCB0 on the left side is larger than that of city block distance ΔCB1 on the right side. As understood from FIG. 12, the distribution of city block distance CB in the vicinity of the minimum point is approximated by the lines L1, L2 and the point of intersection of L1 and L2 is determined as an i corrodinate isub of the coincidence point Pi.

Further, a j coordinate value jsub of the coincidence point Pi is calculated according to the same method as the calculation of isub. Thus, the coincidence point Pi (isub, jsub) having a largest correlation with the reference area Ri can be calculated with resolution less than one pixel. These calculated coincidence points P1, P2 and P3 with respect to the searching ranges S1, S2 and S3, respectively are temporarily stored in RAM (not shown) in the micro-computer 9 (step 10).

Further, at a step 11, it is judged whether or not three samples for every coincidence point Pi (totally 9 samples) are stored. If the judgment is negative, the program goes to RETURN and the aforesaid steps are repeated until three samples are stored. On the other hand, if the judgment is positive, the program goes to a step 12 as shown in FIG. 4.

Figure 13:
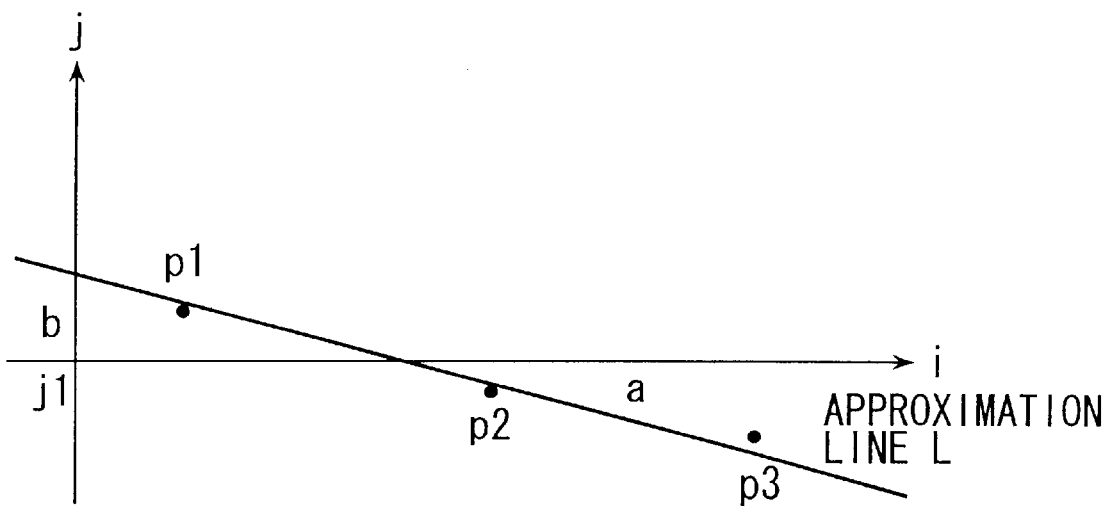
FIG. 13 is a diagram showing an approximation line calculated from a coincidence point.

At a step 12, the coincidence points P1, P2, P3 (three samples per each) are read out, and at a step 13 an approximation line L (j=ai+b+j1) is calculated based on these coincidence points Pi using the least square method. FIG. 13 is a diagram showing an approximation line L calculated from the coincidence points Pi. In this diagram, only three coincidence points Pi in one frame are shown, however, actually there are the coincidence points Pi for three frames.

Parameters a, b thus calculated of the approximation line L represent a degree of deviation of the comparison image with respect to the reference image. In case where there is no deviation of the comparison image with respect to the reference image, the approximation line L is expressed as j=j1 (a=0 and b=0). The reason is that, in this state, there is no deviation excepting horizontal deviation (namely, parallax) between the respective reference points a1, a2, a3 in the reference area Ri and the respective coincidence points P1, P2, P3 thus calculated. In this case, the affine parameters θ, SHFTJ are remained as the current values are. Further, at a step 16, the stored coincidence points Pi are cleared and the program goes to RETURN.

On the other hand, in case where the comparison image has a rotational deviation with respect to the reference image, the parameter a is not zero (a≠0). This means that the current value of affine parameter θ can not completely correct the overall rotational deviation of the comparison image with respect to the reference image. That is, in case of a>0, this means that the comparison image rotates counterclockwise with respect to the reference image and in case of a<0, this means that the comparison image rotates clockwise with respect to the reference image. Here, letting the rotational deviation be Δθ, Δθ is calculated according to the following formula (4 step 14). In accordance with the value of Δθ, the affine parameter θ representing rotation is adjusted by the comparing control (step 15).

$$\Delta\theta = \tan^{-1} a \qquad \text{[Formula 4]}$$

At the step 15, a rotational deviation Δθ multiplied by a specified gain (for example, 0.25) is reduced from the current affine parameter θ. Thus, the comparison image rotates and the rotational deviation of the comparison image with respect to the reference image is adjusted in a canceling direction.

Further, in case where the comparison image shifts in the vertical direction with respect to the reference image, the parameter is not zero (b≠0). This means that the current value of affine parameter SHFTJ can not completely correct the vertical deviation of the comparison image with respect to the reference image. That is, in case of the parameter b>0, this indicates that the comparison image deviates in the upward direction with respect to the reference image and in case of the parameter b <0, this indicates that the comparison image deviates in the downward direction with respect to the reference image. Hence, at a step 15, the parameter b multiplied by a specified gain (for example, 0.25) is reduced from the current affine parameter θ and thus the comparison image moves in the vertical direction and the vertical deviation of the comparison image with respect to the reference image is adjusted in a canceling direction.

Thus, according to this embodiment, a deviation of the comparison image is obtained with respect to the reference image and based on the deviation, the affine parameters θ, SHFTJ of the comparison image are adjusted by the feedback control. This deviation amount is calculated by comparing the reference line H in the reference image with the approximation line L in the comparison image. The reference line H is fixedly established based on the reference point ai showing the position of three reference areas Ri. On the other hand, the approximation line L is established based on the coincidence point Pi showing the position of the area having a brightness correlation with respective reference areas Ri. When the positional deviation of the stereoscopic image is properly adjusted by the affine transformation, the respective reference points ai agree with the respective coincidence points Pi and the approximation line L completely coincides with the reference line H. Accordingly, the existence of the deviation between these two lines indicates that the positional deviation is not completely adjusted. Specifically, the difference between a gradient a of the approximation line L and a gradient (0 in this embodiment) of the reference line H corresponds to a rotational deviation of the comparison image with respect to the reference image. Further, the value b of the approximation line L corresponds to a vertical deviation of the comparison image with respect to the reference image. Even when an optical positional deviation generates in the stereoscopic camera due to aged deteriorations or temperature changes, an affine transformation can be performed so as to extinguish such deviation properly by adjusting the affine parameters θ, SHFTJ according to these values a, b. Further, by calculating distance data based on image signals subjected to a proper affine transformation, it is possible to enhance the reliability of distance data, that is, the accuracy of surroundings monitoring.

Further, in this embodiment, the searching range Si in which the coincidence point Pi is searched is limited to a relatively narrow range (in this embodiment, 24×24 pixels) determined by referring to the distance data in the reference area Ri. Since the searching range Si is thus narrowed down, it is possible to substantially reduce the amount of the calculation needed for searching the coincidence points Pi. As a result, it is possible to make adjustment of the positional deviation in real time while the surroundings monitoring control is performed.

Further, in this embodiment, it is evaluated whether or not the reference area Ri is a suitable area for performing the two-dimensional matching and the coincidence points Pi are calculated based on the reference area Ri which has been judged to be suitable for the two-dimensional matching. Since this enables to perform the two-dimensional matching with high accuracy, highly reliable coincidence points Pi can be calculated. As a result, the adjustment of the positional deviation can be accurately and stably made.

In this embodiment, the reference area Ri is fixedly established in a specified position of the reference image, however, the reference area Ri may be established variably. For example, several candidates of the reference area Ri are established on the reference line H beforehand. Among them, three areas satisfying the judging conditions described before are selected as the reference area Ri and based on these the coincidence point Pi may be calculated.

(Second Embodiment)

Figure 14:
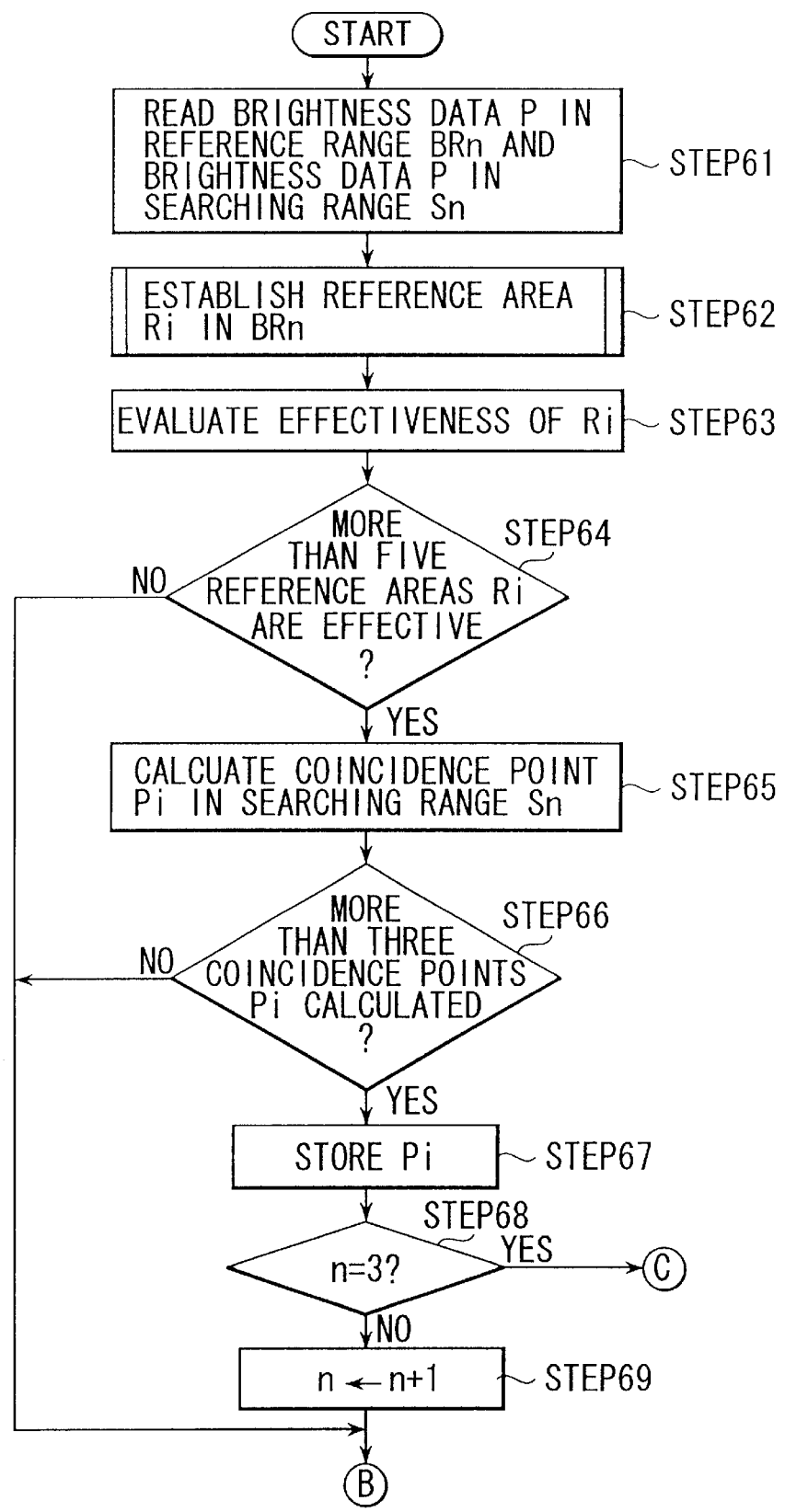
FIG. 14 is a flowchart showing a part of steps for adjusting affine parameters according to a second embodiment.

FIG. 14 is a part of a flowchart showing steps for adjusting the position of stereoscopic images according to a second embodiment. The steps following this flowchart are the same as the steps according to the first embodiment in FIG. 4.

Figure 15:
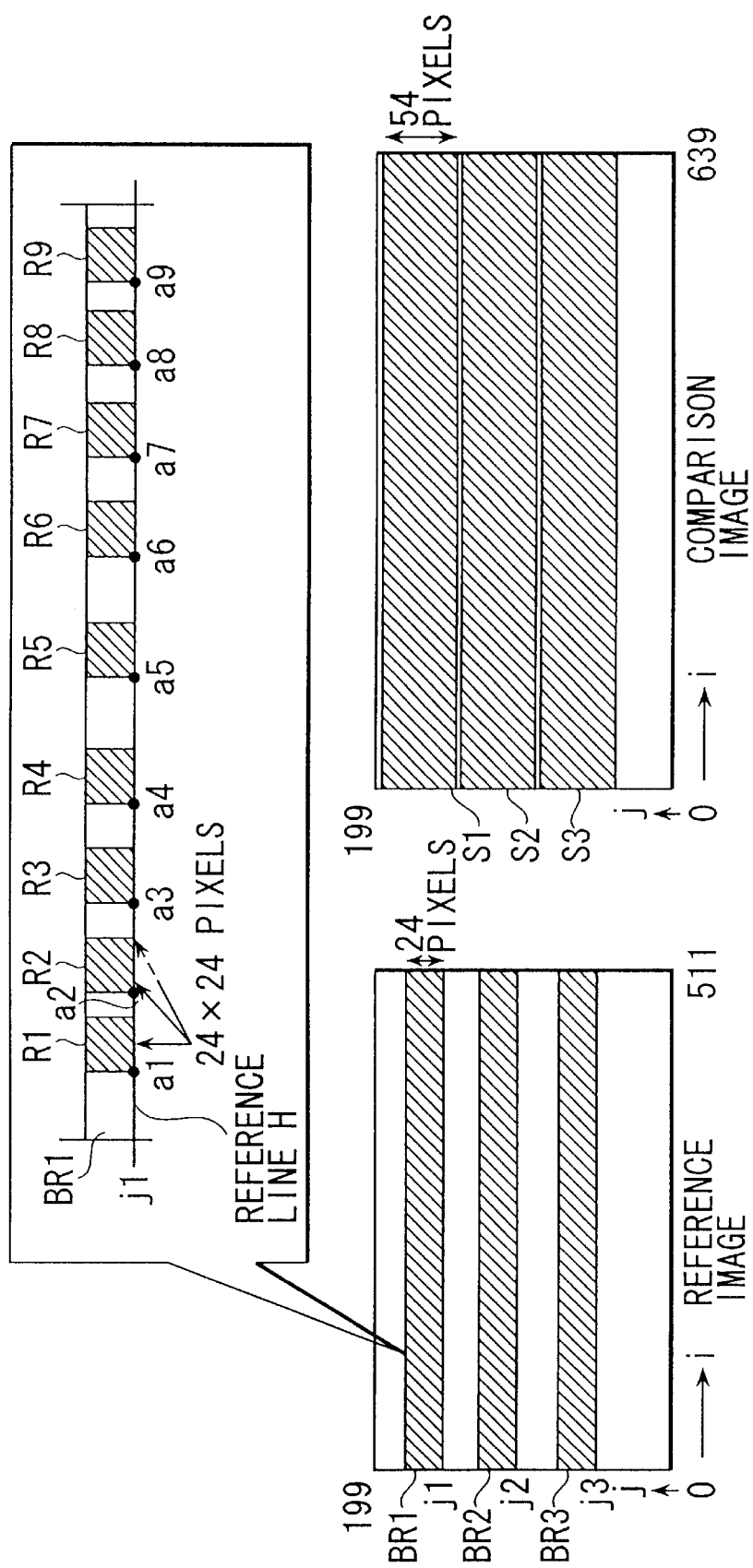
FIG. 15 is a diagram for explaining the establishment of the position of a reference range and a searching area.

First, at a step 61, brightness data p within a reference range BRn (1 n 3) of the reference image and brightness data p within a searching range Sn of the comparison image are read. FIG. 15 is a diagram showing the position in which the reference range BRn and a searching range Sn are established, respectively. Three reference ranges BR1, BR2 and BR3 are established in a different area from each other of the reference image and each reference range has an area of 512×24 pixels. On the other hand, three searching ranges S1, S2 and S3 have an area of 640×54 pixels, respectively. The position of each searching range Sn is established such that the horizontal center line of the searching range Sn coincides with the horizontal center line of the reference range BRn. That is, the searching range Sn is extended upwardly and downwardly by 15 pixels respectively.

The initial value of n is set to 1. Accordingly, in a first cycle of the flowchart, the step 61 is a process for processing the reference range BR1 and the searching range S1 which are located in a highest position of the image. At the step 61 brightness data p are read from the reference range BR1 and the searching range S1, respectively.

At a step 62, nine reference areas Ri (1 n 9) are established in the reference range BR1. Each reference area Ri is established at respective reference points ai on a horizontal line (j=j1) and has an area of 24×24 pixels. The reference points ai are established at a specified interval on the horizontal line.

Next, it is evaluated based on the state of brightness edge in the reference area Ri whether or not the reference area Ri is an area suitable for performing the two-dimensional matching. The evaluation of effectiveness is performed for every reference area R1 to R10 (step 63). In this embodiment, in case where following two judging conditions are satisfied concurrently, the reference area Ri is judged to be effective.

(Judging Conditions)

1. Lots of Brightness Edges are Observed in the Horizontal Direction

A difference of brightness (absolute value) Δp for every pixel between two horizontally adjacent pixels is calculated in the reference area Ri in the same manner as described in FIG. 7. Since the reference area has an area of 24×24 pixels, totally 576 brightness variations Δp are calculated. Next, in order to evaluate the state of horizontal brightness edges in the reference area Ri, the brightness variations larger than a specified threshold value (for example, 20) are counted and the counted number is called a horizontal edge number. If the horizontal edge number exceeds a specified judging value (for example, 20), it is judged that lots of horizontal brightness edges appear.

2. Lots of Brightness Edges are Observed in the Vertical Direction

In the reference area Ri, the brightness variation (absolute value) Δp for every pixel between two vertically adjacent pixels is calculated in the reference area Ri. With respect to pixels on the highest row of the reference area Ri, the brightness variation Δp is calculated from the pixels located adjacently on the upper side. In order to evaluate the degree of observations of the brightness edge in the vertical direction, the number of variations larger than a specified threshold value (for example, 20) is counted rom among 567 brightness variations Δp. Letting the number be a vertical edge number, in case where this vertical edge number is larger than a specified judging value (for example 20), it is judged that lots of vertical brightness edges appear.

Further, at a step 63, the effectiveness of the reference area Ri is checked. In case where the number of the reference areas Ri judged to be effective is less than 5, it is judged that the reference range BR1 in the reference image is not suitable for taking two-dimensional matchings (step 64) and the program for the cycle goes to RETURN (see FIG. 4) without calculating the approximation line L. On the other hand, in case where the reference rang BR1 is judged to be suitable at the step 64, the program goes to a step 65 where the two-dimensional matching is performed with respect to a plurality of reference areas Ri which has been judged to be effective at the step 63.

At the step 65, a correlation object for every reference area Ri is identified in the searching range S1 to calculate a coincidence point Pi. The correlation object of the reference area Ri can be identified by calculating the city block distance CB of an area existing in the searching range S1 and having the same area as the reference area according to the formula 2. The searching of the correlation object may be performed over the entire searching range S1, however, in order to reduce the amount of calculation, the searching is performed in a horizontal range from −10 to 118 pixels with i coordinate value of a reference position P'i centered and in a vertical range of ±15 pixels with j coordinate value of the reference position P'i centered.

Further, in this embodiment, a threshold value (for example, 6500) is provided with the calculated city block distance CB. Only in case where the city block distance CB with respect to the correlation object of the reference area Ri is smaller than the threshold value, that is, in case where the reliability of matching is high, the coincidence point Pi is calculated. Accordingly, in case where the city block distance CB is larger than the threshold value, the coincidence point Pi with respect to the correlation object is not calculated. The calculation of the coincidence point Pi is done according to the steps shown in the flowchart of FIG. 5.

At a step 66, it is judged whether or not three or more coincidence points Pi have been calculated. As described before, according to the present invention, the accuracy of positional deviation is enhanced by calculating the approximation line L from more than three incidence points Pi considering the effect of errors caused by aberrations of lenses and the like. Accordingly, when the judgment is negative at the step 66, the program goes to RETURN without further processes of the deviation adjustment. On the other hand, when the judgment is positive, the program goes to a step 67 where respective coincidence points Pi are stored in the RAM of the micro-computer 9.

Further, at a step 68, it is judged whether or not n is equal to 3. Since n is equal to 1 in the first cycle of the flowchart, the program goes to a step 69. At the step 69, n is increased by 1 and the program goes to RETURN. The steps described above are carried out repeatedly until the coincidence points Pi are calculated and stored for all of three reference ranges BR1, BR2 and BR3.

When the coincidence points Pi are calculated and stored for all of three reference ranges BR1, BR2 and BR3, the judgment at a step 68 is positive and the program goes to a step 12 shown in FIG. 4. Steps thereafter are the same as in the first embodiment and therefore further description has been omitted. In this embodiment, since the j coordinate of the reference range BRi is different from each other, the j coordinate of the respective coincidence points Pi is required to be transformed in the vertical direction as follows. Thus, the j coordinate of the respective coincidence points Pi after transformation corresponds to the vertical deviation "b" in the first embodiment.

Pi(isub, jsub)→(isub, jsub−j1) for a reference range BR1
Pi(isub, jsub)→(isub, jsub−j2) for a reference range BR2
Pi(isub, jsub)→(isub, jsub−j3) for a reference range BR3
where j1, j2, j3 are j coordinates of reference ranges BR1, BR2, BR3, respectively (see FIG. 15).

Thus, the positional deviation of the comparison image with respect to the reference image can be properly adjusted by making a feedback control of the affine parameters θ SHFTJ. Further, the accuracy of surroundings monitoring can be enhanced in the same manner as in the first embodiment by calculating the distance data based on image signals subjected to the affine transformation properly.

According to this embodiment, the coincidence points Pi can be identified without referring to distance data differently from the first embodiment. Accordingly, even under such condition that reliable distance data can not calculated because positional deviation or brightness deviation between two cameras are relatively large, the position adjustment of the stereoscopic image can be effectively performed. Such condition happens for example in a stage of the initial setting of cameras at shipping or in an event of a readjustment due to dead battery-backup or the like.

In the embodiments described before, affine parameters on the comparison image side are adjusted with affine parameters fixed on the reference image side, however the present invention is not limited to this. For example, affine parameters of the comparison image may be fixed and those of the reference image may be adjusted.

Further, when the affine parameters are adjusted, only either θ representing a rotation or only SHFTJ representing a vertical movement may be adjusted.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A positional deviation adjusting apparatus of a stereoscopic camera for adjusting a positional deviation of a first image with respect to a second image, comprising:

image correcting means for transforming said first and second images geometrically according to transformation parameter, respectively;

reference area establishing means for establishing a plurality of reference areas in said first image transformed by said image correcting means;

reference point establishing means for establishing a reference point in each of said reference areas;

reference line establishing means for establishing a reference line passing through each said reference point;

searching area establishing means for establishing a searching area corresponding to said reference areas in said second image;

correlation point identifying means for identifying a correlation point having a correlation with said reference point for each of said searching areas;

approximation line calculating means for calculating an approximation line based on said correlation point; and parameter correcting means for correcting said transformation parameter such that said approximation line coincides with said reference line.

2. A positional deviation adjusting apparatus of a stereoscopic camera for adjusting a positional deviation of a first image with respect to a second image, comprising:

image correcting means for transforming said first and second images geometrically according to transformation parameter, respectively;

stereo calculating means for calculating a distance data based on a brightness correlation between said first image and said second image;

reference area establishing means for establishing a plurality of reference areas in said first image transformed by said image correcting means;

reference point establishing means for establishing a reference point in each of said reference areas;

reference line establishing means for establishing a reference line passing through each said reference point;

searching area establishing means for establishing a searching area corresponding to said reference areas in said second image according to said distance data;

correlation point identifying means for identifying a correlation point having a correlation with said reference point for each of said searching areas;

approximation line calculating means for calculating an approximation line based on said correlation point; and parameter correcting means for correcting said transformation parameter such that said approximation line coincides with said reference line.

3. The apparatus according to claim 2, wherein said searching area is established based on distance data in said reference area so as to include an area having a brightness correlation with said reference area.

4. The apparatus according to claim 2, wherein said searching area is established based on a distance value most frequently observed among distance data.

5. The apparatus according to claim 1, wherein said transformation parameter is at least either a transformation parameter representing a rotation of said second image or a transformation parameter representing a vertical movement of said second image.

6. The apparatus according to claim 2, wherein said transformation parameter is at least either a transformation parameter representing a rotation of said second image or a transformation parameter representing a vertical movement of said second image.

7. The apparatus according to claim 1, wherein said reference areas are established in the horizontal direction of said first image and the number of said reference areas is at least 3.

8. The apparatus according to claim 2, wherein said reference areas are established in the horizontal direction of said first image and the number of said reference areas is at least 3.

9. The apparatus according to claim 2, wherein said correlation point is identified when distance data is larger than a specified value.

10. The apparatus according to claim 2, wherein said correlation point is identified when distance data is within a specified range.

11. The apparatus according to claim 2, wherein said correlation point is identified when the number of said brightness edges is larger than a first threshold value specifying a minimum value of the number of brightness edges.

12. The apparatus according to claim 2, wherein the apparatus counts brightness edges having brightness differences in said reference area, and said correlation point is identified when the number of said brightness edges is smaller than a second threshold value specifying a maximum value of the number of brightness edges.

13. A positional deviation adjusting apparatus of a stereoscopic camera for adjusting a positional deviation of a first image with respect to a second image, comprising:

image correcting means for transforming said first and second images geometrically according to transformation parameter, respectively;

reference area establishing means for establishing a plurality of reference areas in said first image transformed by said image correcting means, said reference areas being established so as to align on a straight line;

searching area establishing means for establishing a search area corresponding to said reference areas and said second image;

correlation point identifying means for identifying a correlation point having a correlation with said reference point for each of said searching areas;

approximation line calculating means for calculating an approximation line based on said correlation point; and parameter correcting means for correcting said transformation parameter according to deviations between said straight line and said approximation line.

* * * * *